(12) United States Patent
Elian et al.

(10) Patent No.: US 12,405,202 B2
(45) Date of Patent: Sep. 2, 2025

(54) SEMICONDUCTOR DEVICE FOR PARTICLE MEASUREMENT AND METHOD FOR OPERATING THE SEMICONDUCTOR DEVICE

(71) Applicant: Infineon Technologies AG, Neubiberg (DE)

(72) Inventors: Klaus Elian, Alteglofsheim (DE); Ludwig Heitzer, Falkenfels (DE); Fabian Merbeler, Munich (DE); Matthias Eberl, Taufkirchen (DE); Thomas Müller, Lappersdorf (DE); Andreas Allmeier, Pfatter (DE); Derek Debie, Bogen (DE); Cyrus Ghahremani, Regensburg (DE); Jens Pohl, Bernhardswald (DE); Christian Irrgang, Sinzing (DE)

(73) Assignee: Infineon Technologies AG, Neubiberg (DE)

(*) Notice: Subject to any disclaimer, the term of this patent is extended or adjusted under 35 U.S.C. 154(b) by 333 days.

(21) Appl. No.: 18/301,469

(22) Filed: Apr. 17, 2023

(65) Prior Publication Data
US 2023/0341311 A1    Oct. 26, 2023

(30) Foreign Application Priority Data
Apr. 26, 2022   (DE) .......................... 102022110093.6

(51) Int. Cl.
*G01N 15/06*   (2024.01)
*G01N 15/00*   (2006.01)
(Continued)

(52) U.S. Cl.
CPC ......... *G01N 15/0656* (2013.01); *G01N 15/00* (2013.01); *G01N 15/0606* (2013.01); (Continued)

(58) Field of Classification Search
CPC ............... G01N 15/0656; G01N 15/00; G01N 15/0606; G01N 15/02; G01N 15/0266; G01N 2015/0046; G01H 13/00
See application file for complete search history.

(56) References Cited

U.S. PATENT DOCUMENTS

2007/0145099 A1* 6/2007 Beckwith ......... G01N 35/00722
 228/101
2013/0154670 A1    6/2013 Cooke et al.
(Continued)

FOREIGN PATENT DOCUMENTS

DE    102011089261 A1    6/2013
DE    102017211970 A1    1/2019
(Continued)

*Primary Examiner* — Benjamin R Schmitt
(74) *Attorney, Agent, or Firm* — Harrity & Harrity, LLP

(57) ABSTRACT

The application relates to a semiconductor device for particle measurement having a cavity housing and a MEMS chip arranged inside the cavity housing. The housing includes a first opening, via which the cavity is connected to the surroundings and in which a first grating is arranged, which is capable by setting it to a first electrical potential of attracting particles from the surroundings and/or electrically charging them. The MEMS chip includes a membrane facing toward the first opening, which is capable by setting it to a second electrical potential of attracting particles. The application furthermore relates to a method for operating a semiconductor device having a cavity housing and a MEMS chip arranged inside the cavity housing.

18 Claims, 5 Drawing Sheets

(51) Int. Cl.
　　　*G01H 13/00*　　　(2006.01)
　　　*G01N 15/02*　　　(2006.01)

(52) U.S. Cl.
　　　CPC ..... *G01H 13/00* (2013.01); *G01N 2015/0046* (2013.01); *G01N 15/02* (2013.01); *G01N 15/0266* (2013.01)

(56) References Cited

U.S. PATENT DOCUMENTS

2013/0168781 A1　　7/2013　Mantese et al.
2020/0309665 A1*　10/2020　Schneider .......... G01N 15/0637

FOREIGN PATENT DOCUMENTS

| | | |
|---|---|---|
| DE | 102017219327 A1 | 5/2019 |
| EP | 3715826 A1 | 9/2020 |
| WO | 2018/193109 A1 | 10/2018 |

\* cited by examiner

SEMICONDUCTOR DEVICE FOR PARTICLE MEASUREMENT AND METHOD FOR OPERATING THE SEMICONDUCTOR DEVICE

CROSS REFERENCE TO RELATED APPLICATION

This application claims priority to German Patent Application No. 102022110093.6 filed on Apr. 26, 2022, the content of which is incorporated by reference herein in its entirety.

TECHNICAL FIELD

The application relates to a semiconductor device for particle measurement having a cavity housing and a MEMS chip arranged inside the cavity housing, as well as a method for operating the semiconductor device.

BACKGROUND

Particles are understood as small bodies of various natures, which comprise, for example, dust, including fine and ultrafine dust, nanoparticles, such as soot and aerosols and/or other particles, such as viruses, bacteria, flakes of skin, fine crystal splinters, or the like.

A particle measurement of the air is used, for example, in smoke detectors. If smoke particles are in the air and penetrate into a cavity of a housing of the smoke detector, a light beam emitted from a light source in the cavity of the smoke detector is scattered and reflected by the smoke particles. A part of this scattered light is incident on a light-sensitive photodiode and an alarm can be triggered. Such smoke detectors require quite large housings, since the volume of the cavity has to be sufficiently large to have a measurable number of particles—in case of alarm.

There are applications for which it is desirable to make devices for particle measurement smaller.

SUMMARY

In a semiconductor device for particle measurement having a cavity housing and a MEMS chip arranged inside the cavity housing, the housing includes a first opening, via which the cavity is connected to the surroundings. A first grating is arranged in the first opening, which is capable by setting it at a first electrical potential of attracting and/or electrically charging particles from the surroundings. The MEMS chip includes a membrane facing toward the first opening, which is capable by setting it at a second electrical potential of attracting particles.

A MEMS chip (MEMS=micro-electromechanical system) is a component which combines logic elements and micromechanical structures in a chip. A MEMS chip can process items of mechanical and electrical information and can include very small structures in the micrometer range.

The housing of the semiconductor device can be a cavity housing in the manner of a cavity housing, in which the walls of the housing include the same material in the manner of a cave. The housing can be formed like a trough and in particular can be integrally formed. The housing can also be a cavity housing which is formed as a type of hood, which is placed with a mounting opening on a substrate, on which the MEMS chip can be located. In this implementation, the substrate can then form a wall or a part of a wall of the housing. The housing can then include the first opening in addition to the mounting opening on a further side.

The grating arranged in the first opening can in particular be made electrically conductive and can be electrically insulated from the housing. By setting it at the first electrical potential, particles from the surroundings of the semiconductor device can be attracted and/or electrically charged. In particular electrically charged particles which are charged opposite to the first grating can be attracted by the first grating. Other particles can be polarized by the first grating, also attracted by the first grating, and electrically charged upon passing the first grating, for example upon touching the first grating. Further particles which reach the area of the first grating, for example due to a flow of the ambient air, can be electrically charged, for example upon touching the first grating.

Particles located in the cavity of the semiconductor device can be attracted by the electrically charged membrane of the MEMS chip. The MEMS chip includes an evaluation electronics unit, via which physical changes of the membrane by the particles can be detected and evaluated. In particular—depending on the design of the semiconductor device—it can be detected whether particles are located in the cavity, how many particles are located in the cavity, whether the concentration of the particles changes over time, which size the particles located in the cavity have, etc.

By setting the first grating at the first potential and setting the membrane at the second electrical potential, it is possible for the concentration of the particles within the cavity and in particular on the membrane or in the vicinity of the membrane to be greater than in the surroundings of the semiconductor device. The concentration within the cavity and in particular on the membrane or in the vicinity of the membrane can thus be increased. The cavity can thus be miniaturized and the size of the semiconductor device as a whole can be reduced. This miniaturization of the semiconductor device acting as a particle sensor can enlarge the area of application, in particular in areas where installation spaces are tight, for example in the automobile.

By the design of the semiconductor device and in particular by suitable selection of the first and the second potential, the concentration of the particles within the cavity and/or the extent of the adhesion of the particles to the membrane can be influenced in dependence on properties of the particles, in particular the mass of the particles. It is thus also possible to influence how many particles of which mass adhere to the membrane.

In implementations of the semiconductor device, the cavity is connected via passages of the first grating to the surroundings and the passages are capable of letting particles from the surroundings reach the cavity. The size of the passages is selected in particular so that particles can reach the cavity. In implementations, the first grating fills the first opening at least partially, but also possibly entirely.

In implementations, the first grating set to the first potential is capable of electrically charging the particles upon passage. This can be achieved, for example, by a suitable selection of the size of the passages, so that a sufficiently large number of particles touch the first grating upon passing it and can thus be electrically charged. The first grating having its passages can optionally be configured so that particles which pass the first grating through the passages being electrically charged is promoted and assisted.

In implementations, the size of the passages can be selected so that they are particularly suitable for letting particles of a desired size pass and/or bringing them into contact with the electrically charged first grating.

In example implementations of the semiconductor device, the MEMS chip is arranged on a wall of the housing and the membrane is configured so that particles adhere thereon. The wall of the housing can be a substrate, for example, on which the MEMS chip is applied and on which the cavity housing is placed like a hood. The wall of the housing can be, for example, a wall of an integrally formed housing, in the manner of a cavity housing. If the particles which are attracted by the membrane adhere thereto, at least one physical property of the membrane thus changes, which can be detected and evaluated by the evaluation electronics unit of the MEMS chip. This change is amplified by the property of the membrane that it is configured as adhesive to particles, so that the detection of the particle concentration is further improved. The particle detection is further improved even in smaller cavities in this way.

In example implementations, the MEMS chip is arranged on a wall which is opposite to the first opening. This can cause particles which pass the first grating and enter the cavity to be able to strike the membrane in their movement direction. An additional attraction due to the electrical charge of the membrane can make the striking even more probable and can thus improve a concentration of the particles on the membrane. The particle measurement can thus be further improved.

The particles can be measured by the evaluation electronics unit of the MEMS chip in that the membrane of the MEMS chip is set into oscillation and a resonance property of the oscillation, in particular the resonance frequency, is detected by the evaluation electronics unit of the MEMS chip. A change, in particular a shift, of the resonance frequency can be dependent, for example, on a particle adhesion on the membrane, in particular on an extent of the adhesion, for example on a mass of the adhering particles on the membrane. The evaluation electronics unit of the MEMS chip is configured to detect such a change of the resonance property, in particular the shift of the resonance frequency of the membrane, and to draw conclusions therefrom about, for example, the concentration of particles in the surroundings of the semiconductor device.

In example implementations of the semiconductor device, at least one electrode is attached to at least one further wall of the housing, which is settable to an electrical electrode potential, is thus electrically chargeable, and is thus capable of deflecting the particles. The deflection can be caused, for example, by electrical attraction (with opposing polarity) or by electrical repulsion (with the same polarity). In particular electrically charged particles which are located within the cavity are either attracted or repelled and thus deflected in their movement direction by the electrical charge of the electrode. The deflection can be dependent here on a property of the particle, in particular its mass. By the design of the semiconductor device and in particular by suitable selection of the first potential, the second potential, and the electrode potential, the deflection can be influenced in dependence on a property of the particle, in particular its mass. It is therefore also possible to influence how many particles of which property, for example mass, adhere on the membrane. In further examples of the semiconductor device, further electrodes are attached to walls of the housing and set to further electrical electrode potentials. For example, a further electrode can be attached to a wall of the housing opposite to the electrode, wherein the further electrode is set to a further electrical electrode potential. The deflection of the particles can be further influenced in this way.

In example implementations of the semiconductor device, at least one magnet, for example a permanent magnet, is attached to at least one further wall of the housing. The magnet is configured and attached so that its magnetic field extends in the interior of the cavity. Moving charged particles can be deflected in their movement direction by the magnetic field (Lorenz force). The deflection, thus the change of the direction of movement, can be dependent here on a property of the particle, in particular the mass. By the design of the semiconductor device and in particular by suitable selection of the strength and shape of the magnet and its magnetic field, the deflection can be influenced in dependence on a property of the particle, in particular the mass. It is thus also possible to influence how many particles of which property, for example mass, adhere to the membrane. In further examples of the semiconductor device, further magnets, for example permanent magnets, are attached to walls of the housing. For example, a further magnet can be attached to a wall of the housing opposite to the magnet. In this way, the deflection of the particles can be further influenced. The magnet or magnets can be configured as permanent magnets or non-permanent magnets, thus, for example, as suitable electromagnets excited as needed.

In example implementations of the semiconductor device, the housing includes a second opening, via which the cavity is connected to the surroundings and in which a second grating is arranged, which is capable by setting it to a third electrical potential of deflecting particles. The second opening can be arranged in a different wall of the housing than the first opening. In example implementations of the semiconductor device, the housing includes a third opening, via which the cavity is connected to the surroundings and in which a third grating is arranged, which is capable by setting it to a fourth electrical potential of attracting particles from the surroundings and/or electrically charging particles and/or deflecting particles in the cavity. Two of the openings can be arranged opposite to one another, in particular the second and the third opening can be arranged opposite to one another. The second and the third gratings can consist of electrically conductive material and can be made electrically insulated from the housing.

In example implementations of the semiconductor device, the potentials of two of the gratings and the membrane are selected so that there is a potential difference between one of the gratings, the membrane, and a further one of the gratings. This potential difference is furthermore selected so that it is capable of attracting particles from the surroundings and/or electrically charging them, accelerating them at an angle to the membrane, removing particles adhering on the membrane, and discharging particles from the cavity. In this example, the particle adhesion to the membrane can be reversed up to a certain extent and the service life of the semiconductor device for particle measurement can thus be extended.

A method for operating an above-described semiconductor device includes the following steps:
  setting the first grating to a first electrical potential, so that the first grating is capable of attracting particles from the surroundings and/or electrically charging them;
  setting the membrane to a second electrical potential, so that the membrane is capable of attracting particles;
  repeatedly detecting a resonance property of the membrane.

In one implementation of the method, a property of the particles and/or a concentration of the particles in the surroundings is determined from the resonance property of the membrane. This refines the measurement, since statements can be made about the concentration and/or the property of the particles. In particular, it can be made possible to draw conclusions about the masses of the particles.

The semiconductor device can be operated in a second operating mode for cleaning. The second operating mode includes the following steps:
  setting one of the gratings to a third electrical potential, so that the grating is capable of deflecting particles;
  setting the membrane of the MEMS chip to the second or a further potential;
  setting a further one of the gratings to a fourth electrical potential, so that the further grating is capable of deflecting particles in the cavity and/or attracting particles in the surroundings and/or electrically charging particles;
  so that the potential difference between the one of the gratings, the membrane, and the further one of the gratings is capable of
  attracting particles from the surroundings and/or electrically charging them, accelerating them obliquely toward the membrane,
  removing particles adhering to the membrane, and
  discharging particles from the cavity.

The second operating mode can be used as a cleaning operating mode, in which particles adhering to the membrane are detached from the membrane again and discharged from the cavity. In this way, the particle measurement process can be made reversible to a certain extent and the service life of the semiconductor device as a particle meter can thus be extended.

BRIEF DESCRIPTION OF THE DRAWINGS

Examples of semiconductor devices and methods are explained in more detail hereinafter by way of example with reference to the appended figures. In the figures.

The same reference signs are used for identical or similar elements in the figures.

DETAILED DESCRIPTION

Figure 1:
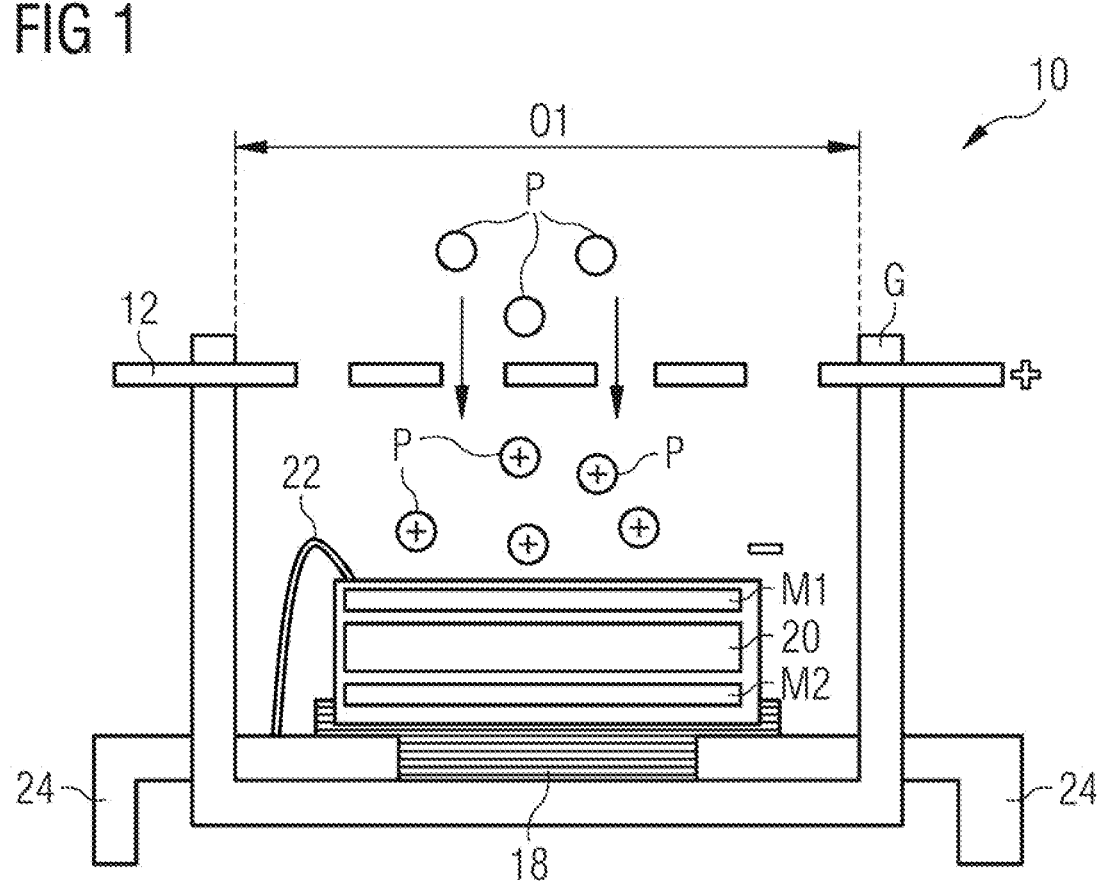
FIG. 1 shows a schematic illustration of an example of the semiconductor device.

FIG. 1 shows an example implementation of a semiconductor device 10 having a cavity housing G, in which a MEMS chip 20 is arranged. The housing G includes an opening O1, in which a first grating 12 is arranged. The first grating 12 is set to a first electrical potential. In the illustrated example, it is charged with a positive electrical charge. The first grating 12 is arranged essentially parallel to the opposite wall of the housing, on which the MEMS chip 20 is attached and is connected to the wall using an adhesive layer.

The MEMS chip 20 includes two membranes M1, M2, of which one membrane M1 faces toward the opening O1 of the housing and extends essentially in parallel to the first grating 12. The MEMS chip 20 is connected via a bonding connection 22 to a contact 24, via which the semiconductor device 10 can be connected to an evaluation electronics unit of the MEMS chip 20 on a substrate. In the illustrated example, the substrate is arranged outside the housing G. The contact 24 is led via feedthroughs from inside the housing G to outside the housing G. In other example implementations, the MEMS chip 20 is attached directly to the substrate and the cavity housing G is attached like a hood over the MEMS chip 20, so that a mounting opening of the cavity housing is covered by the substrate. In this example implementation, the first opening O1 is then, for example, opposite to the mounting opening. In other implementations, the evaluation electronics unit of the MEMS chip 20 can be arranged inside the housing G and can be an optional component of the MEMS chip 20 arranged in the housing G.

The membranes M1, M2, but preferably at least the membrane M1 facing toward the opening O1, can be set into mechanical oscillations. For this purpose, for example, electrical signals transmitted from the evaluation electronics unit are converted by a micro-electromechanical transducer of the MEMS chip 20 into oscillations of the membrane M1. The membrane M1 has a resonance frequency, which can be, for example, in the ultrasonic range, thus in the megahertz range. The membrane M1 is preferably set into oscillations in its resonance frequency. The evaluation electronics unit is configured and configured here to determine the resonance of the current oscillation of the membrane M1. The MEMS chip 20 can have, for example, similarities to a MEMS pressure sensor and a piezoelectric transducer can be used as in a MEMS pressure sensor.

The first grating 12 includes passages, via which the cavity of the housing G is connected to the surroundings. Particles P which are located in the surroundings of the housing, for example floating particles P in the ambient air, can be electrostatically attracted by the first grating 12, for example due to intrinsic charge or due to a charge shift in the particle P. It is also possible that particles P are moved due to an airflow in the surroundings of the semiconductor device 10 in the direction of the first grating 12, for example if the semiconductor device is arranged in a flow channel of, for example, an air-conditioning system. The particles P moving toward the first grating 12 can be electrically charged upon passing the first grating 12, for example upon touching the grating. In the illustrated example, the particles P located in the cavity carry a positive charge.

The particles P can be both electrically conductive particles P, such as soot (carbon), and also electrically nonconductive particles P, such as nonconductive dusts. The particles P can also be water molecules in the air, so that the semiconductor device can also be used for measuring the ambient humidity. Particles P can also be, for example, organic volatile molecules, such as oil vapors.

The membrane M1 is set to a second electrical potential—in the illustrated example to a negative electrical potential. The particles P located in the cavity can now be attracted by the membrane M1, for example due to their electrical charge, which is opposite to the charge of the membrane M1. The membrane M1 is preferably formed here so that the particles P remain adhering thereon.

The resonance frequency of the membrane M1 is changed by the particle adhesion on the membrane M1. In particular, the change is also dependent on the cumulative mass of the particles P adhering on the membrane. The evaluation electronics unit can detect the change of the resonance frequency and determine therefrom the cumulative mass of the adhering particles P and/or the extent of the particle adhesion. The particle concentration in the cavity and in the surroundings of the semiconductor device can in turn be concluded therefrom.

The particles P can remain adhering on the membrane M1 in example implementations. This means that in the course of the operating time of the particle sensor, the particle adhesion on the membrane M1 of the MEMS chip 20 continuously increases and—to retain the measurement quality—the sensor is supposed to be replaced at some point in time.

Figure 2:
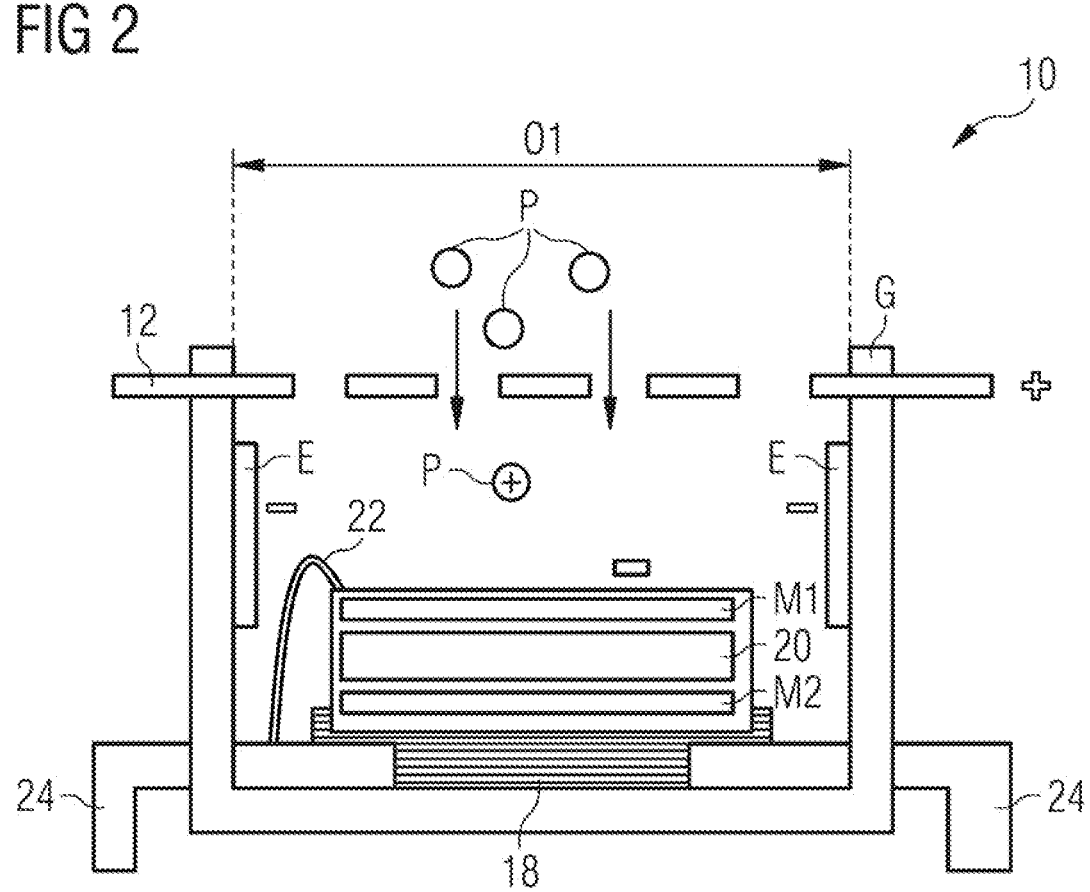
FIG. 2 shows a schematic illustration of a semiconductor device having electrodes.

In the example implementation shown in FIG. 2, electrodes are additionally arranged on walls of the housing G, which extend in the direction from the first grating 12 to the membrane M1. Two electrodes are shown in FIG. 2, which are each set to an electrical electrode potential, which can be a negative charge, for example, and is between the charge zero and the negative charge of the membrane M1 with respect to absolute value, for example. Particles P located in the cavity, which move from the first grating 12 in the direction of the membrane M1, can be additionally deflected via the electrodes, for example because they are charged. In this way, it is possible to take an influence on which type of particles P adhere to the membrane M1 and which are deflected under certain circumstances so that they do not strike the membrane M1. In this way, the semiconductor device 10 for measuring particles P can be configured even more precisely, so that, for example, certain particle types, for example particles P having a certain size and/or mass, can be deliberately detected and/or deliberately not detected, thus rejected.

In the example shown in FIG. 2, both electrodes are set to the same electrode potential. It is also possible to provide two different electrode potentials and to set each electrode to one of the two different electrode potentials.

Figure 3:
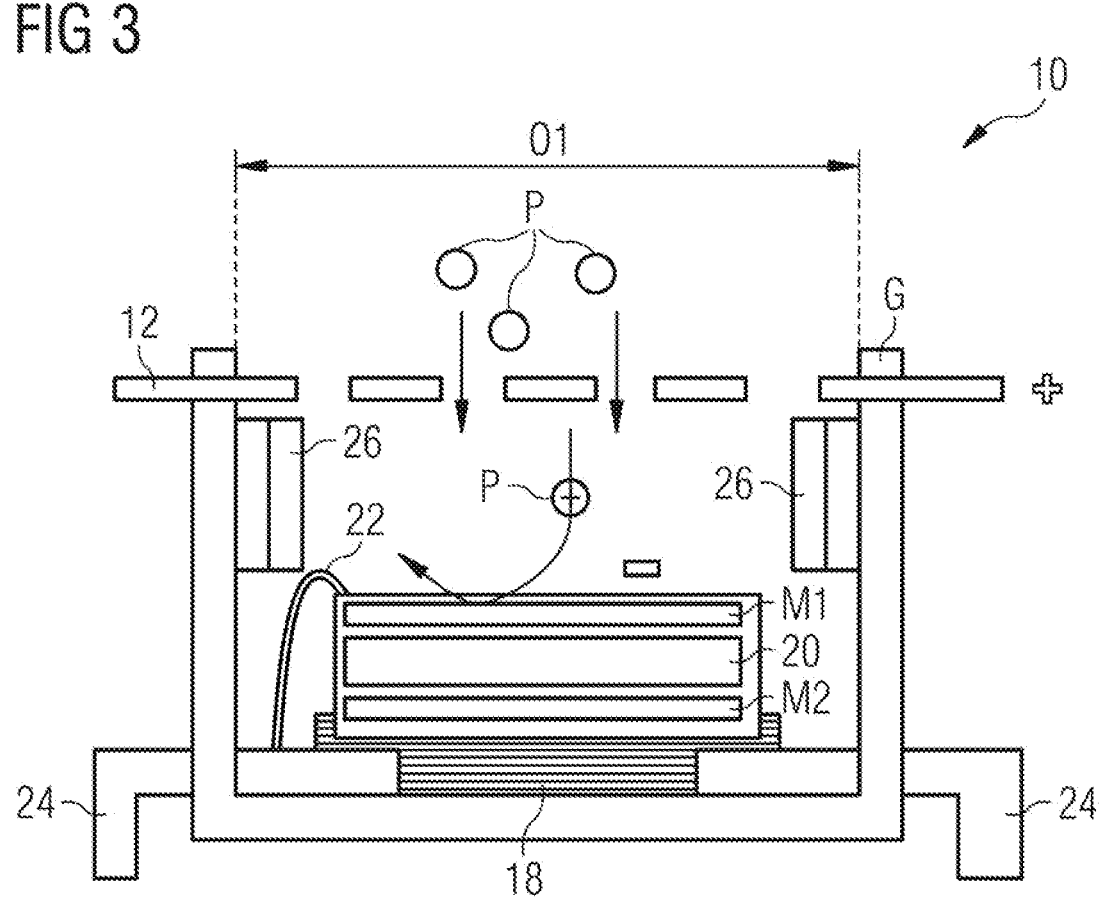
FIG. 3 shows a schematic illustration of a semiconductor device having magnets.

In the example implementation shown in FIG. 3, magnets 26 are additionally arranged on walls of the housing G, which extend in the direction from the first grating 12 to the membrane M1. Two permanent magnets are shown in FIG. 3. Particles P located in the cavity, which are charged and move from the first grating 12 in the direction of the membrane M1, can be additionally deflected via the magnets 26. In this way, it is possible to take an influence on which type of particles P adhere to the membrane M1 and which are deflected under certain circumstances so that they do not strike the membrane M1. In this way, the semiconductor device 10 for measuring particles P can be configured even more precisely, so that, for example, certain particle types, for example particles P having a certain size and/or mass, can be deliberately detected.

In the semiconductor devices 10 of FIG. 2 and FIG. 3, it is also possible to take an influence, due to the design having the electrodes E and the magnets 26, on the size which the particles P are which strike the membrane and are measured thereby. The semiconductor device 10 can therefore be deliberately configured for measuring certain particle sizes and/or types by its formation and design.

Figure 4:
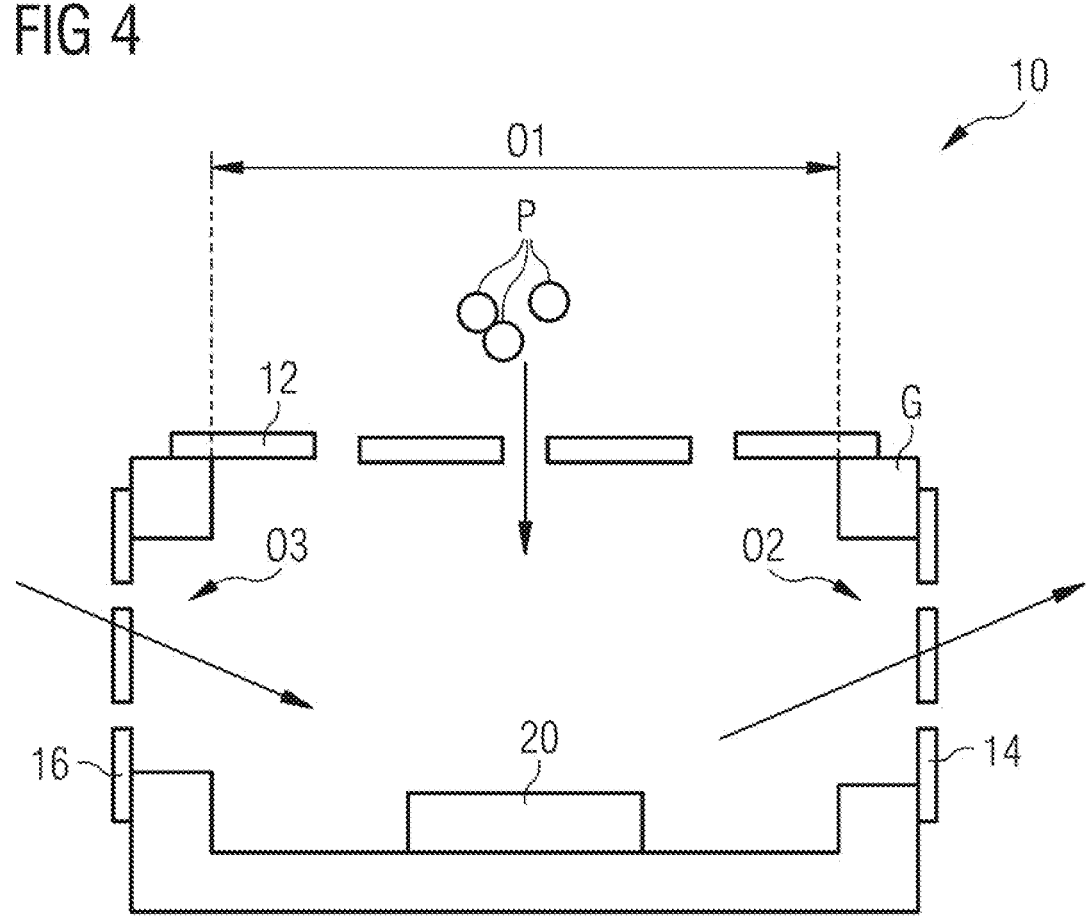
FIG. 4 shows a schematic illustration of a semiconductor device having three openings.

In the example implementation shown in FIG. 4, one wall of the housing G, which extends in the direction from the first grating 12 to the membrane M1, includes a second opening O2, in which a second grating 14 is arranged. The cavity is connected to the surroundings of the semiconductor device 10 via passages in the second grating 14. The second grating 14 is set to a third electrical potential, so that it is capable of deflecting particles P in the cavity of the housing G, for example due to their electrical charge.

A further wall of the housing G, which extends in the direction from the first grating 12 to the membrane M1, includes a third opening O3, in which a third grating 16 is arranged. The third opening O3 is arranged opposite to the second opening O2 in the illustrated example. The cavity is connected to the surroundings of the semiconductor device 10 via passages in the third grating 16. The third grating 16 is set to a fourth electrical potential, so that it is capable of attracting particles P in the surroundings of the housing G, for example due to their electrical charge or their polarization, and/or deflecting particles in the cavity and/or electrically charging particles P upon passing the third grating 16, for example, when the particles P touch the third grating 16 upon passing it.

Particles P from the surroundings of the semiconductor device 10 can be attracted by electrostatic attraction and accelerated in the direction of the grating via the first grating 12 in the first opening 1 and/or the third grating 16 in the third opening O3. Particles P can already be electrically charged outside the cavity and/or particles P can be electrically charged upon passing the first grating 12 or upon passing the third grating 16, for example upon touching the first or third grating 12, 16.

The particles P in the cavity can be deflected by electrical attraction or repulsion by the second grating 14. It is shown by the arrows in the example illustrated in FIG. 4 how particles are attracted from the cavity in the direction of the second grating 14. Optionally, particles P which enter the cavity through the first grating 12 can be repelled by the third grating 16 due to the electrical charges and thus can additionally be accelerated obliquely in the direction of the membrane M1.

The example implementation of FIG. 4 thus enables a second operating mode B2 for cleaning the particle meter for the semiconductor device 10, in addition to the first operating mode B1 as a particle meter. The cleaning is carried out in particular by removing particles P adhering to the membrane M1 and discharging the particles P from the cavity through the passages of the second grating 14 into the surroundings of the semiconductor device.

In particular, the semiconductor device 10 of FIG. 4 is configured and configured to attract particles P from the surroundings of the semiconductor device 10, and to let them pass through passages of first and/or third grating 12, 16 into the cavity.

The particles P are accelerated toward the membrane M1 by the electrical charge of the membrane M1. The particles P passing through the first opening O1 into the cavity can be deflected by the charge of the third grating 16 and accelerated obliquely toward the membrane M1. Due to the electrical charge of the second grating 14, the particles P in the cavity can also be deflected and—in the illustrated example—attracted by the second grating 14 and discharged from the cavity. Particles P reaching the cavity through the third grating 16 can also be accelerated obliquely toward the membrane by the electrical charge of the membrane M1 and thus remove the charge adhering there.

The semiconductor device is configured and configured so that the particles P striking obliquely on the membrane M1 again remove particles P already adhering to the membrane M1 by striking on the membrane M1. The removed particles P are then discharged together with the removing particles P through the passages in the second grating 14 from the cavity of the semiconductor device 10. In one possible design of the semiconductor device, the second potential of the membrane M1 can be, for example, 1 V, the third potential of the second grating 14 can be, for example, 0 V, and the fourth potential of the third grating 15 can be, for example, 5 V.

This enables a certain cleaning of the membrane M1 and thus a certain renewal, so that a particle adhesion on the membrane M1 which is excessively large overall, as could be possible in the examples of FIGS. 1 to 3, can be avoided. The service life of the particle meter can be extended in this way.

Figure 5:
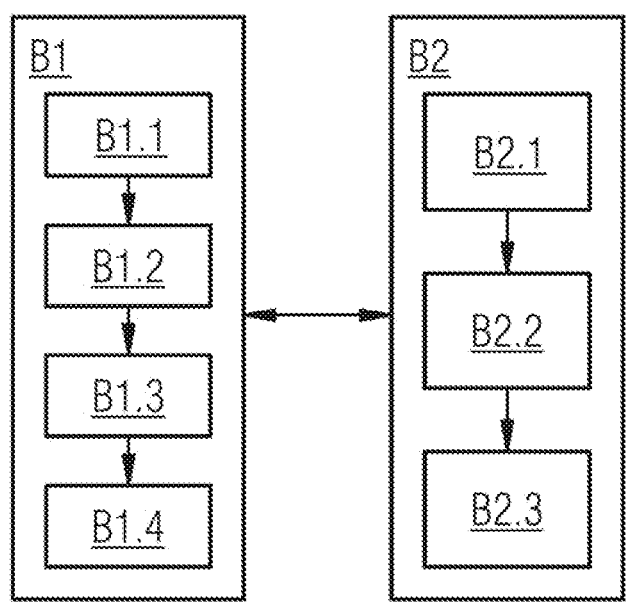
FIG. 5 shows a schematic illustration of an example of a method having two operating modes.

A method for operating a semiconductor device 10 having a cavity housing G and a MEMS chip 20 arranged inside the cavity housing G is shown in FIG. 5. The operation of the semiconductor device 10 in a first operating mode B1 for particle measurement includes the following steps:

B1.1: Setting the first grating 12 to a first electrical potential, so that the first grating 12 is capable of attracting particles P from the surroundings and/or electrically charging them.

B1.2: Setting the membrane M1 to a second electrical potential, so that the membrane M1 is capable of attracting particles P.

B1.3: Repeatedly detecting a resonance property of the membrane M1.

B1.4: Determining a property of the particles P and/or a concentration of the particles P in the surroundings of the semiconductor device 10 from the resonance property of the membrane M1.

In a semiconductor device 10, in which the housing G of the semiconductor device 10 includes, in addition to the first opening O1 having the first grating 12, a second opening O2, via which the cavity is connected to the surroundings and in which a second grating 14 is arranged, and in which the housing G of the semiconductor device 10 optionally includes a third opening O3, via which the cavity is connected to the surroundings and in which a third grating 16 is arranged, the described method includes a second operating mode B2 for cleaning. The method in the second operating mode B2 includes the following steps:

B2.1: Setting one of the gratings 12, 14, 16 to a third electrical potential, so that the grating 12, 14, 16 is capable of deflecting particles P.

B2.2: Setting the membrane M1 of the MEMS chip 20 to the second or a further potential.

B2.3: Setting a further one of the gratings 12, 14, 16 to a fourth electrical potential, so that the further grating 12, 14, 16 is capable of deflecting particles P in the cavity and/or attracting particles P in the surroundings of the semiconductor device 10 and/or electrically charging them.

The steps are executed and the potentials are selected so that the potential difference between the one of the gratings 12, 14, 16, the membrane M1, and the further one of the gratings 12, 14, 16 is capable of
  attracting particles P from the surroundings and/or electrically charging them, accelerating them obliquely toward the membrane M1, removing particles P adhering to the membrane M1, and discharging particles P from the cavity.

It is possible by way of the operation of the semiconductor device of FIG. 4 in the second operating mode B2 to reverse the adhesion of the particles P on the membrane M1 and at least partially remove them again. The use of the MEMS chip 20 for particle measurement can thus be made at least partially reversible and its service life can be extended.

The described method in the first operating mode B1 is suitable for any of the semiconductor devices 10 as shown in FIGS. 1 to 4. The described method in the second operating mode B2 is suitable for the semiconductor device 10 shown in FIG. 4.

The invention claimed is:

1. A semiconductor device for measuring particles having a cavity housing and a micro-electromechanical system (MEMS) chip arranged inside a cavity formed by the cavity housing,
  wherein the cavity housing includes a first opening, via which the cavity is connected to a surroundings and in which a first grating is arranged, wherein the first grating is capable, by setting the first grating to a first electrical potential, of one or more of attracting particles from the surroundings or electrically charging the particles from the surroundings,
  wherein the MEMS chip includes a membrane facing toward the first opening, wherein the membrane is configured to, by setting the membrane to a second electrical potential of attracting the particles from the surroundings.

2. The semiconductor device as claimed in claim 1, wherein the cavity is connected to the surroundings via passages of the first grating and the passages are configured to enable the particles from the surroundings to reach the cavity.

3. The semiconductor device as claimed in claim 2, wherein the first grating set to the first potential is capable of electrically charging the particles upon passage to the cavity.

4. The semiconductor device as claimed in claim 1, wherein the MEMS chip is arranged on a wall of the cavity housing and the membrane is configured so that particles adhere to the membrane.

5. The semiconductor device as claimed in claim 4, wherein the MEMS chip is arranged on a wall which is opposite to the first opening.

6. The semiconductor device as claimed in claim 4, wherein the MEMS chip is configured to detect a resonance property of the membrane.

7. The semiconductor device as claimed in claim 6, wherein the membrane is configured so that the resonance property is dependent on a mass of the particles adhere to the membrane.

8. The semiconductor device as claimed in claim 1, wherein at least one electrode is attached to at least one further wall of the cavity housing, wherein the at least one electrode is settable to an electrode potential, and wherein the at least one electrode is capable of deflecting the particles.

9. The semiconductor device as claimed in claim 1, wherein at least one magnet is attached to at least one further wall of the cavity housing, wherein the at least one magnet is capable of deflecting moving charged particles.

10. The semiconductor device as claimed in claim 1, wherein the cavity housing includes a second opening, via which the cavity is connected to the surroundings and in which a second grating is arranged, wherein the second grating is capable, by setting it to a third electrical potential, of deflecting the particles.

11. The semiconductor device as claimed in claim 10, wherein the cavity housing includes a third opening, via which the cavity is connected to the surroundings and in which a third grating is arranged, wherein the third grating is capable, by setting it to a fourth electrical potential, of at least one of deflecting the particles, attracting the particles from the surroundings, or electrically charging the particles.

12. The semiconductor device as claimed in claim 11, wherein one of the first opening, the second opening, or the third opening is opposite of another one of the first opening, the second opening, or the third opening.

13. The semiconductor device as claimed in claim 11, wherein a potential difference between one of the first grating, the second grating, or the third grating, the membrane, and a further one of the first grating, the second grating, or the third gratings is capable of at least one of attracting the particles from the surroundings, or electrically charging the particles from the surrounding, accelerating the particles from the surrounding at an angle toward the membrane, removing the particles adhering to the membrane, and discharging the particles from the cavity.

14. A method for operating a semiconductor device having a cavity housing and a micro-electromechanical system (MEMS) chip arranged inside a cavity formed by the cavity housing, wherein the cavity housing includes a first opening, via which the cavity is connected to a surroundings and in which a first grating is arranged, wherein the MEMS chip includes a membrane facing toward the first opening, wherein an operation in a first operating mode for particle measurement includes:

setting the first grating to a first electrical potential to configure the first grating to at least one of:
attract particles from the surroundings, or
electrically charge the particles from the surroundings;

setting the membrane to a second electrical potential to configure the membrane to attract the particles from the surroundings; and repeatedly detecting a resonance property of the membrane.

15. The method as claimed in claim 14, further comprising:

determining, based on the resonance property of the membrane, one or more of a property of the particles or a concentration of the particles in the surroundings of the semiconductor device.

16. The method as claimed in claim 14, for operating the semiconductor device in a second operating mode for cleaning, wherein the cavity housing of the semiconductor device includes a second opening, via which the cavity is connected to the surroundings and in which a second grating is arranged, and wherein the cavity housing of the semiconductor device includes a third opening, via which the cavity is connected to the surroundings and in which a third grating is arranged, the method further comprising:

setting one of the first grating, the second grating, or the third grating to a third electrical potential, so that the one of the first grating, the second grating, or the third grating is capable of deflecting the particles;

setting the membrane of the MEMS chip to the second potential or a further potential;

setting a further one of the first grating, the second grating, or the third grating to a fourth electrical potential, so that the further one of the first grating, the second grating, or the third grating is capable of at least one of deflecting the particles from the surroundings, attracting the particles from the surroundings, or electrically charging the particles from the surroundings;

so that the potential difference between the one of the first grating the second grating, or the third grating, the membrane, and the further one of the first grating, the second grating, or the third grating is capable of at least one of attracting the particles from the surroundings or electrically charging the particles from the surroundings, accelerating the particles from the surroundings obliquely toward the membrane, removing the particles adhering to the membrane, and discharging the particles from the cavity.

17. The method as claimed in claim 14, wherein the cavity is connected to the surroundings via passages of the first grating, and wherein the passages are configured to allow the particles to travel between the surroundings and the cavity.

18. The method as claimed in claim 17, wherein the first grating is set to the first potential to configure the first grating to electrically charge the particles based on the particles traveling from the surroundings to the cavity.

* * * * *